(12) United States Patent
Sano et al.

(10) Patent No.: US 7,278,285 B2
(45) Date of Patent: Oct. 9, 2007

(54) METHOD AND DEVICE FOR PRODUCING TUBULAR FORMED BODY

(75) Inventors: Takuzo Sano, Hiratsuka (JP); Noboru Takada, Hiratsuka (JP)

(73) Assignee: The Yokohama Rubber Co., Tokyo (JP)

( * ) Notice: Subject to any disclaimer, the term of this patent is extended or adjusted under 35 U.S.C. 154(b) by 0 days.

(21) Appl. No.: 10/561,609

(22) PCT Filed: Jul. 13, 2004

(86) PCT No.: PCT/JP2004/009962

§ 371 (c)(1),
(2), (4) Date: Dec. 20, 2005

(87) PCT Pub. No.: WO2005/009641

PCT Pub. Date: Feb. 3, 2005

(65) Prior Publication Data

US 2006/0144110 A1    Jul. 6, 2006

(30) Foreign Application Priority Data

Jul. 24, 2003   (JP) ............................. 2003-279113
Jul. 24, 2003   (JP) ............................. 2003-279115

(51) Int. Cl.
*B21D 22/00* (2006.01)
(52) U.S. Cl. ............................................. 72/84; 72/82
(58) Field of Classification Search ............... 72/82, 72/83, 84, 85, 95, 295, 301, 302, 311; 29/894.325, 29/894.354
See application file for complete search history.

(56) References Cited

U.S. PATENT DOCUMENTS 2,826,804 A * 3/1958 Wickwire et al. .......... 29/892.3
5,212,866 A * 5/1993 Wenzel et al. ........... 29/894.354
7,124,609 B1 * 10/2006 Hermanson .................... 72/82

FOREIGN PATENT DOCUMENTS

| DE | 101 49 086 C1 | 2/2003 |
|---|---|---|
| JP | 57-175401 | 10/1982 |
| JP | 57-184534 | 11/1982 |

(Continued)

OTHER PUBLICATIONS

International Search Report, Oct. 26, 2004.

*Primary Examiner*—Ed Tolan
(74) *Attorney, Agent, or Firm*—Greer, Burns & Crain, Ltd.

(57) ABSTRACT

A forming device having a rotating frame (1) and a forming blade (2) movable in the axial and radial directions of the rotating frame. One side-edge portion of a tubular blank (B) is fixed to a predetermined position of the rotating frame (1), and the other side-edge portion is movably set on the rotating frame. While the rotating frame (1) is rotated, the forming blade (2) is pressed to the inner diameter side or the outer diameter side of a peripheral wall of the tubular blank (B). The forming blade is reciprocated from the fixed side-edge portion radially outward or inward and moved toward the movable side-edge portion. Thus, a tubular formed body in which at least a ridge portion or a recess portion continuing in circumferential direction is shaped in the peripheral wall is formed.

10 Claims, 6 Drawing Sheets

FOREIGN PATENT DOCUMENTS

| | | | |
|---|---|---|---|
| JP | 60-3922 | * | 1/1985 |
| JP | 63-16816 | * | 1/1988 |
| JP | 01-166826 | | 6/1989 |
| JP | 06-190477 | | 7/1994 |
| JP | 09-201625 | | 8/1997 |
| JP | 09-276967 | | 10/1997 |
| JP | 2002-282949 | | 10/2002 |
| JP | 2004-066284 | | 3/2004 |

* cited by examiner

METHOD AND DEVICE FOR PRODUCING TUBULAR FORMED BODY

This application is a 35 USC 371 of PCT/5P04/09962 filed Jul. 13, 2004.

TECHNICAL FIELD

The present invention relates to a method and device for producing a tubular formed body. More specifically, the present invention relates to a method and device for producing a tubular formed body which make it possible to form a tubular formed body such as an annular shell of a run-flat support body and a wheel rim without causing wrinkles and ruptures even when a metal material having a large breaking stress is used for a blank.

BACKGROUND ART

FIG. 8 illustrates one example of a known run-flat tire/wheel assembly. A run-flat support body 32 is attached to the inside of a pneumatic tire 31 mounted on a wheel rim 30. The run-flat support body 32 is configured by attaching elastic rings 34, 34 such as rubber to both leg end portions of an annular shell 33. The annular shell 33 is formed so that two ridge portions 33a, 33a are extended in the circumferential direction in the outer periphery.

Tubular formed bodies such as the wheel rim and the annular shell constituting the tire/wheel assembly as described above are generally made of metal because they need large strengths. As production methods thereof, casting and sheet-metal working are known. However, the former, casting, takes a long time from the injection of melted metal into a mold to the detaching of the metal from the mold, and therefore has the disadvantage that productivity is low compared to that of the latter, sheet-metal working.

Patent Document 1 discloses a method of forming a metal plate into a wheel rim. In this forming method, using a tubular blank obtained by previously processing a metal plate into a tubular shape, the tubular blank is formed by strongly pressing the peripheral wall of the tubular blank with the peripheral wall interposed between a pair of forming rollers having opposite male and female forming surfaces. However, in this forming method, large plastic deformation occurs in the side-edge portions of the peripheral wall of the wheel rim in processing. Accordingly, there is the problem that wrinkles and ruptures are prone to appear because excessively large strain concentrates in the vicinities thereof. In particular, when a metal material having a larger breaking stress is used in order to improve the strength, wrinkles and ruptures are significantly more prone to appear.

On the other hand, Patent Document 2 discloses a method of forming an annular shell of a run-flat support body. In this forming method, while a tubular blank made of a metal plate is being rotated, the peripheral wall thereof is interposed between forming rollers from inside and outside to be pressed, whereby a ridge portion continuing in the circumferential direction is formed. However, as in the case of the above-described wheel rim forming method, there is the problem that when both side-edge portions of the tubular blank are bent, wrinkles and ruptures are prone to appear in the vicinities thereof. In particular, when a metal material having a larger breaking stress is used in order to improve the strength, wrinkles and ruptures are significantly more prone to appear.

Patent Document 1: Japanese Patent application Kokai publication No. Sho 57-175401
Patent Document 2: German Patent DE10149086C1

DISCLOSURE OF THE INVENTION

An object of the present invention is to provide a method and device for producing a tubular formed body which make it possible to form a tubular blank without causing wrinkles and ruptures in the side-edge portions of the tubular blank even when the tubular blank is made of a metal material having a large breaking stress.

A tubular formed body production method of the present invention which achieves the above-described object includes the steps of: using a forming device having a rotating frame and a forming blade movable in axial and radial directions of the rotating frame; fixing one side-edge portion of a tubular blank to a predetermined position of the rotating frame; setting other side-edge portion of the tubular blank to the rotating frame so that the other side-edge portion is movable; pressing the forming blade to any one of an inner diameter side and an outer diameter side of a peripheral wall of the tubular blank while rotating the rotating frame; reciprocating the forming blade from the fixed side-edge portion in any one of radially outward and inward directions and moving the forming blade toward the movable side-edge portion; and forming a tubular formed body in which at least one recess portion continuing in circumferential direction is shaped in the peripheral wall.

Further, a tubular formed body production device of the present invention includes: a rotating frame coupled to a rotating shaft; and a forming blade movable in axial and radial directions of the rotating frame. One side-edge portion of a tubular blank is fixed to a predetermined position of the rotating frame, and other side-edge portion thereof is set to the rotating frame to be movable. The tubular formed body production device further includes a control unit for pressing the forming blade to any one of an inner diameter side and an outer diameter side of a peripheral wall of the tubular blank, and for reciprocating the forming blade from the fixed side-edge portion in any one of radially outward and inward directions and moving the forming blade toward the movable side-edge portion.

As described above, according to the present invention, in a state in which one side-edge portion of the tubular blank is fixed to a predetermined position of the rotating frame and in which the other side-edge portion thereof is set to be movable, the forming blade is: pressed against the outer diameter side of the peripheral wall of the tubular blank; reciprocated from the fixed side-edge portion in the radially inward direction; and moved toward the movable side-edge portion, or the forming blade is: pressed against the inner diameter side of the peripheral wall of the tubular blank; reciprocated from the fixed side-edge portion in the radially outward direction; and moved toward the movable side-edge portion. Accordingly, the tubular blank can be formed so that the diameter is reduced or expanded only in an intermediate region without deforming the fixed portions of the side-edge portions of the tubular blank.

Thus, forming is performed without concentrating strain such as compressive stress on the fixed portions of the side-edge portions. Accordingly, even a tubular blank made of a metal material having a large breaking stress can be formed into a tubular formed body in which a recess or ridge portion is formed in the peripheral wall thereof without causing wrinkles and ruptures in the side-edge portions. Additionally, since the real forming is bending, the thickness of the tubular blank is hardly changed and can be made even in thickness. Accordingly, a tubular formed body having excellent durability can be obtained.

Moreover, in the present invention, a tubular formed body can be fabricated without fabricating an expensive die for each design.

BESTMODES FOR CARRYING OUT THE INVENTION

Figure 1:
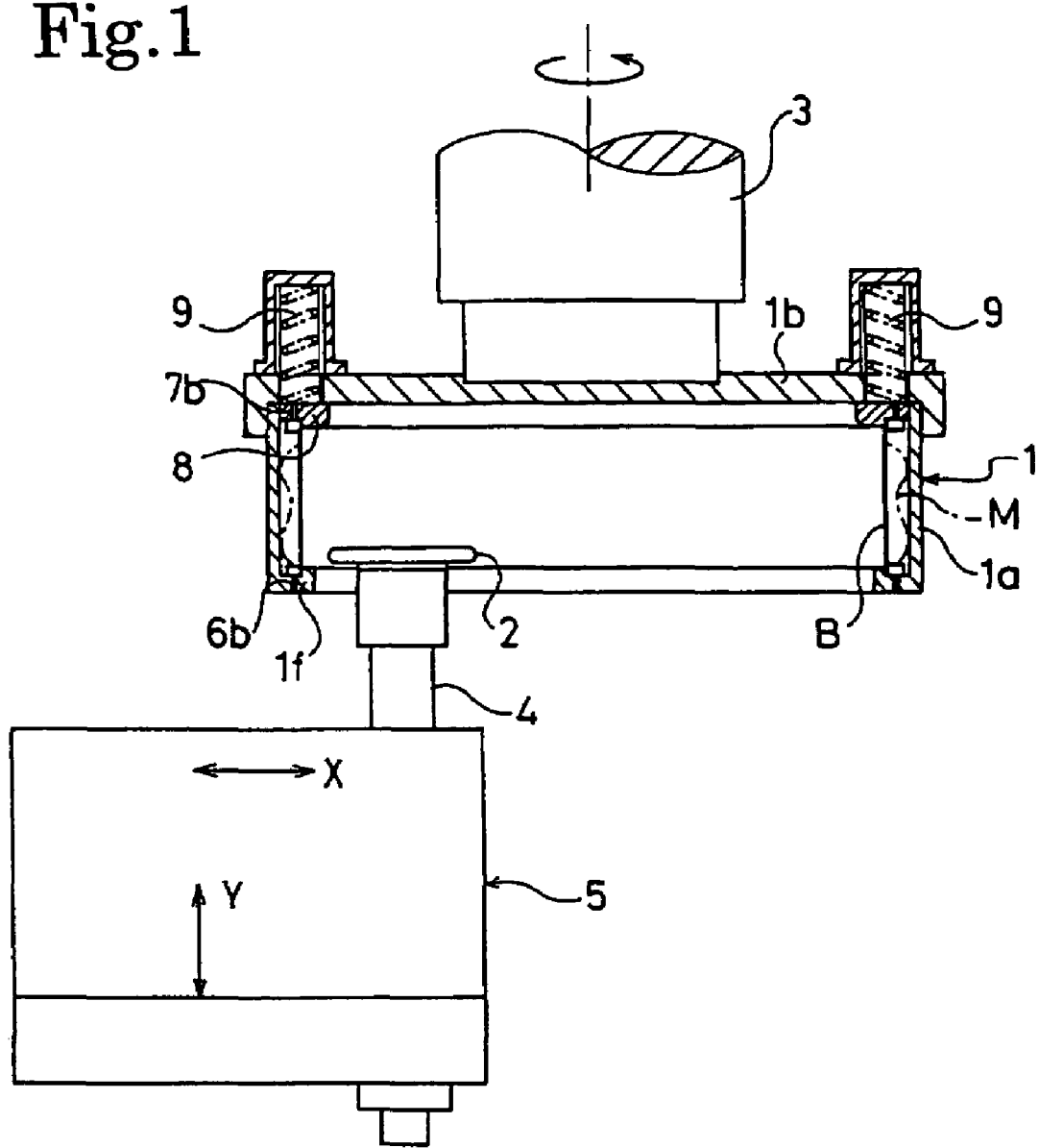
FIG. 1 is a schematic diagram illustrating a forming device used in a production method of the present invention.

In the present invention, a tubular formed body is not particularly limited as long as it is a tubular body having a recess portion or a ridge portion continuing in the circumferential direction in the peripheral wall thereof. Examples include a wheel rim used in an automobile wheel, and an annular shell of a run-flat support body provided in a run-flat wheel. In addition, a corrugated pipe used as a component of a fluid-conveying pipe, a ring reinforcement used as a component of a tubular vessel or a chemical reactor, and the like can be taken as examples.

Further, a tubular blank is a half-processed blank material made of metal material, which has not been formed into a tubular formed body yet. The tubular blank is preferably one obtained by: bending a rectangularly cut plane metal plate to form it into a roll; bringing the two bent edges into contact to weld them; and then grinding and smoothing the welded portion. Alternatively, a tubular body is acceptable which is obtained by slicing a steel pipe having a predetermined inner diameter into pieces having a predetermined width.

The metal material constituting the tubular blank is not particularly limited as long as the metal material has durability necessary for being used as a wheel rim or the like. In order to ensure more excellent durability, it is preferable to use a metal material having a breaking stress of not less than 600 MPa, more preferably a breaking stress in a range of 800 to 1200 MPa. In particular, steel is recommended. A metal material having a large breaking stress of not less than 600 MPa has the disadvantage that, in the case of known press forming, wrinkles and ruptures appear in the side-edge portion when a side-edge portion is formed radially outward or inward by drawing. However, by a processing method of the present invention, forming can be performed without causing wrinkles and ruptures.

In the present invention, the shape of the peripheral wall of the tubular blank is not particularly limited, but preferably one which is rectangular in a cross section containing the central axis thereof, i.e., the shape of a right circular cylinder. Further, when this tubular blank is formed, in the case where a recess portion is formed in the peripheral wall so as to continue in the circumferential direction, the outer diameter of the tubular blank is preferably made substantially equal to the maximum outer diameter of the tubular formed body after forming. On the other hand, in the case where a ridge portion is formed in the peripheral wall so as to continue in the circumferential direction, the inner diameter of the tubular blank is preferably made substantially equal to the minimum inner diameter of the tubular formed body after forming.

As described above, only an intermediate region is deformed so that the diameter thereof is reduced or expanded without deforming the side-edge portions of the peripheral wall, by making the outer diameter of the tubular blank substantially equal to the maximum outer diameter of the tubular formed body after forming in the former case, or by making the inner diameter of the tubular blank substantially equal to the minimum inner diameter of the tubular formed body after forming in the latter case. Accordingly, a compressive force and the like can be prevented from being applied to the side-edge portions. Thus, forming can be performed without causing wrinkles and ruptures in the side-edge portions even when the tubular blank is made of a metal material having a large breaking stress.

In the present invention, the thickness of the peripheral wall of the tubular blank is not particularly limited, but preferably 1.0 to 2.0 mm. If the thickness is less than 1.0 mm, the processability is improved, but the durability of the tubular formed body is deteriorated. On the other hand, if the thickness is more than 2.0 mm, the weight increases, and therefore the fuel efficiency becomes low in applications such as an automobile wheel rim and an annular shell of a run-flat support body.

As a forming device used in a method of producing a tubular formed body of the present invention, used is a device including a rotating frame rotationally driven and a forming blade movable in the axial and radial directions of the rotating frame. When the peripheral wall of the tubular blank is formed so that a ridge portion continues in the circumferential direction, the forming blade is operated so as to move on the inside (inner diameter side) of the rotating frame. On the other hand, when the peripheral wall of the tubular blank is formed so that a recess portion continues in the circumferential direction, the forming blade is operated so as to move on the outside (outer diameter side) of the rotating frame. Additionally, the radial movement and axial movement of the forming blade that are relative to the rotating frame are controlled by numerical control (NC) or the like.

In order to form a tubular formed body having at least one recess or ridge portion in the peripheral wall of the tubular blank, using the above-described forming device, the tubular blank is first set to the rotating frame of the forming device coaxially so as to rotate integrally with the rotating frame. Further, when the tubular blank is set to the rotating frame, one side-edge portion of the tubular blank is fixed to a predetermined position so as not to move relative to the rotating frame in either of the radial and axial directions. Meanwhile, the other side-edge portion thereof is supported so as to be movable at least in the axial direction.

The movable side-edge portion is preferably allowed to move only in the axial direction, and is desired to be regulated so as not to move in the radial direction. More preferably, the movable side-edge portion is regulated to be at the same radial position as that of the side-edge portion fixed to a predetermined position. Means for regulating the movable side-edge portion as described above can be achieved by, for example,: providing a ring inside the rotating frame so as to be slidable in the axial direction; coupling the movable side-edge portion to this ring; and biasing the ring toward the side-edge portion fixed to a predetermined position, using a spring, an actuator such as an oil-hydraulic cylinder, or the like. Alternatively, the movement of the movable side-edge portion can also be regulated by placing a wave-shaped die having a shape corresponding to the outer peripheral shape of the tubular formed body after forming, on the outside of the tubular blank in the radial direction when the peripheral wall is formed into a raised shape, or on the inside of the tubular blank in the radial direction when the peripheral wall is formed into a recessed shape.

After the tubular blank is set to the rotating frame as described above, the tubular blank in the rotating frame is formed by operating the forming blade so that the forming blade moves in the axial and radial directions while the rotating frame is being rotated. In this moving operation, when the peripheral wall of the tubular blank is formed into a raised shape, the forming blade is: pressed against the inner diameter side of the peripheral wall of the tubular blank; reciprocated radially outward from the side-edge portion fixed to a predetermined position; and moved toward the movable side-edge portion. On the other hand, when the peripheral wall of the tubular blank is formed into a recessed shape, the forming blade is: pressed against the outer side of the peripheral wall of the tubular blank; reciprocated radially inward from the side-edge portion fixed to a predetermined position; and moved toward the movable side-edge portion. Through this operation of moving the forming blade, the diameter of an intermediate region of the peripheral wall of the tubular blank is reduced to form an inwardly recessed shape in the former case, or is expanded to form an outwardly raised shape in the latter case. Further, the movable side-edge portion is gradually moved toward the side-edge portion fixed to a predetermined position due to the diameter reduction or expansion.

By moving the forming blade from the side-edge portion fixed to a predetermined position to the movable side-edge portion as described above, a ridge portion in which the diameter is expanded outward or a recess portion in which the diameter is reduced inward is formed in the peripheral wall of the tubular blank. In this case, after the above-described forward forming is finished, the ridge or recess portion processed in the forward forming may be re-formed by moving the forming blade from the movable side-edge portion to the side-edge portion fixed to a predetermined position, in the reverse direction to that of the forward forming. Further, at least one reciprocating forming operation may be performed when necessary by repeating two or more reciprocations of the above-described reciprocating forming. Such reciprocating forming is effective in the case where the tubular blank is made of, for example, a metal material or the like having a large breaking stress, and makes processing with more higher dimensional accuracy possible.

Moreover, using corner portions of fixing and gripping portions as supporting points, the side-edge portions of the tubular blank are folded radially outward when the peripheral wall is formed into a raised shape, and are folded radially inward when the peripheral wall is formed into a recessed shape. Accordingly, the corner portions are preferably beveled into arc shapes. This beveling prevents the folded portions of the side-edge portions from being bent with excessively small curvature radii and therefore makes it possible to avoid the appearance of wrinkles and breakage caused by stress concentration. The curvature radii of the beveled portions of the corner portions are preferably approximately 2 to 10 mm.

Hereinafter, the present invention will be specifically described based on embodiments illustrated in drawings.

FIG. 1 illustrates a forming device used in a method of producing a tubular formed body of the present invention, particularly in the case where an annular shell of a run-flat support body is formed.

In FIG. 1, 1 denotes a rotating frame, and 2 denotes a forming blade. The rotating frame 1 has a cylindrical holding frame 1a. A disk-shaped support plate 1b is fixed to the back surface of the holding frame 1a. The rotating frame 1 is rotationally driven by a drive shaft 3 coupled to the central axis of the support plate 1b. On the other hand, the forming blade 2 has a disk-like shape, and the cross section of an outer peripheral contact portion has an arc shape. The forming blade 2 is rotationally driven by a drive shaft 4, and operated by a drive unit 5 so as to move in the radial direction (X direction) and the axial direction (Y direction) of the rotating frame 1. The moving operation is numerically controlled (NC) by a program previously set in a control unit (not shown).

Figure 2:
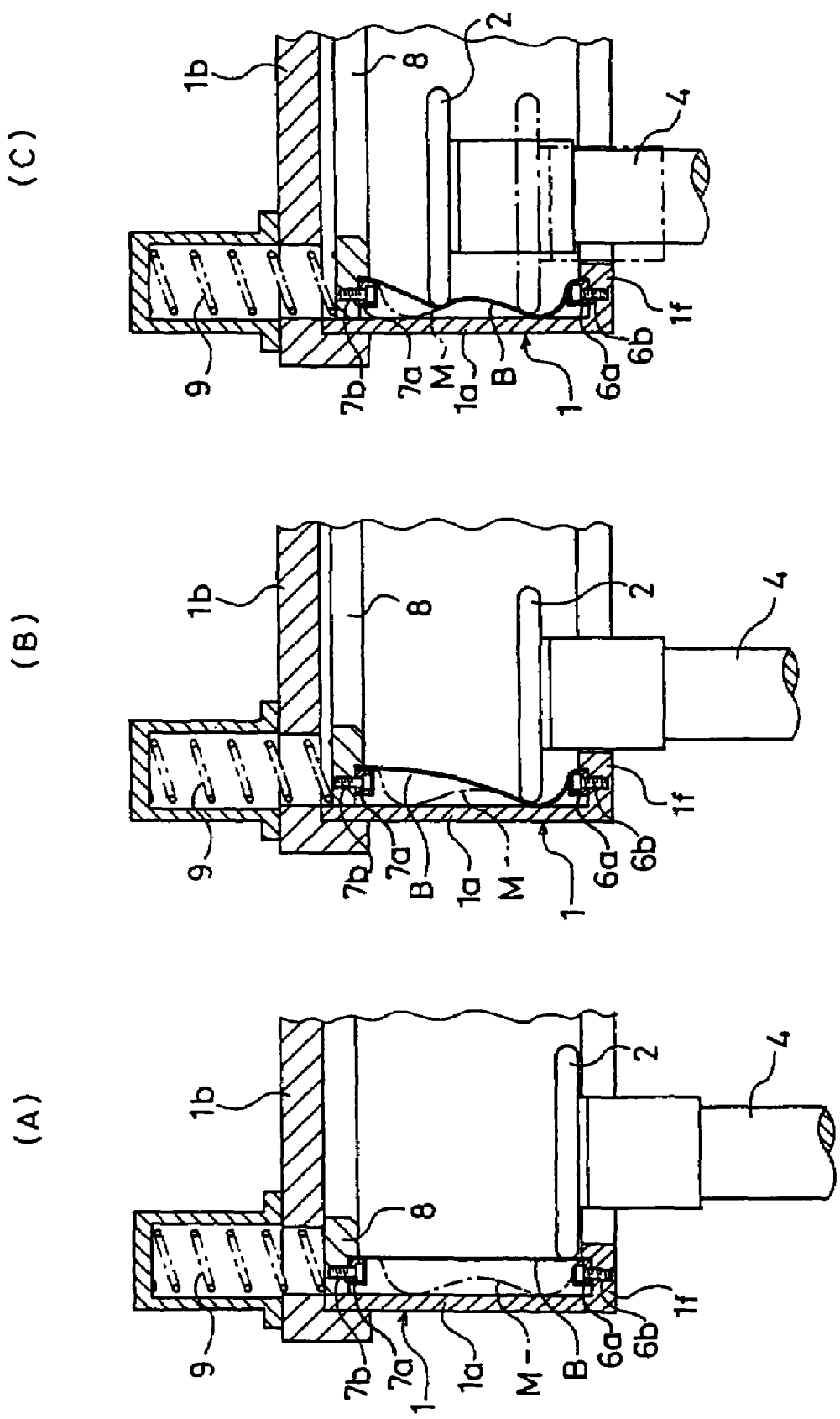
FIGS. 2A to 2C are explanatory diagrams illustrating steps of a method of forming a tubular formed body using the forming device of FIG. 1.

A tubular blank B, which is a workpiece, is set in the holding frame 1a of the rotating frame 1. As illustrated in FIGS. 2A to 2C, in the rotating frame 1 (holding frame 1a), one side-edge portion of the tubular blank B is fixed to a predetermined position of a flange portion if using a gripping ring 6a and bolts 6b, whereby the movement of the side-edge portion in the radial and axial directions is limited. On the other hand, the other side-edge portion thereof is fixed to a ring 8, which is inserted in the rotating frame 1 (holding frame 1a) so as to be slidable in the axial direction, using a gripping ring 7a and bolts 7b, whereby the other side-edge portion can move with the ring 8 in the axial direction. In the inner gripping surfaces of the gripping rings 6a and 7a, the corner portions thereof, which serve as supporting points when the side-edge portions of the tubular blank B are folded, are beveled into arcs having curvature radii of approximately 2 to 10 mm. Further, the ring 8 is biased by springs 9 arranged regularly in the circumferential direction of the support plate 1b, whereby the movable side-edge portion of the tubular blank B is biased toward the fixed side-edge portion (flange 1f) thereof.

Through the operation of moving the forming blade 2, the tubular blank B set to the rotating frame 1 (holding frame 1a) as described above is formed into an annular shell, which is a tubular formed body M having an outer peripheral shape indicated by a chain line, as illustrated in FIGS. 2A to 2C in order.

First, as illustrated in FIG. 2A, the forming blade 2 is inserted into the inner diameter side of the peripheral wall of the tubular blank B supported by the rotating frame 1 (holding frame 1a), and is pressed against the inner surface of the side-edge portion of the tubular blank B which is fixed to a predetermined position (fixed using the bolts 6b).

Then, as illustrated in FIGS. 2B and 2C, the contact portion of the forming blade 2 is reciprocated radially outward from the side-edge portion fixed to a predetermined position along the outer peripheral surface shape (ridge portion) of the tubular formed body M (annular shell) which is indicated by a chain line so that the diameter is expanded, and is moved in the axial direction, whereby, in the peripheral wall of the tubular blank B, a ridge portion is formed so as to continue in the circumferential direction. In a process in which the ridge portion is formed in the peripheral wall of the tubular blank B as described above, the movable side-edge portion coupled to the ring 8 is biased by the springs 9 to gradually move toward the portion fixed to a predetermined position. This movement differs depending on the length of the path along which the forming blade 2 moves when forming the peripheral wall. Thus, as indicated by chain lines in the drawings, the tubular formed body M, which is an annular shell that has an outer peripheral surface having two ridge portions arranged radially outward, is formed.

The operation of forming the tubular blank B into the tubular formed body M may be finished by performing only the above-described forward process of FIGS. 2A to 2C. However, after the forward process is finished, the operation of re-forming the ridge portion processed in the forward process may be performed by moving the forming blade 2 from the movable side-edge portion to the side-edge portion fixed to a predetermined position in the reverse direction. Further, this reciprocating forming process may be repeated at least two times.

Figure 3:
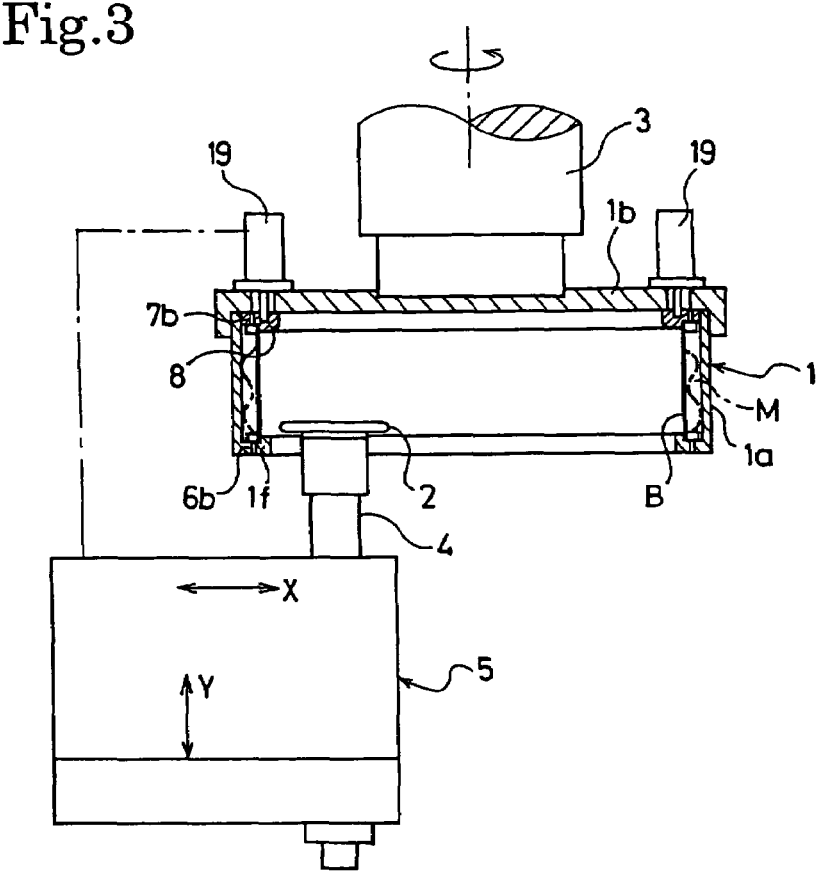
FIG. 3 is a schematic diagram illustrating another embodiment of a forming device used in the present invention.

Moreover, the operation of moving the forming blade 2 which is illustrated in the example of the drawings is carried out by: previously storing, in the control unit, the outer peripheral shape of the tubular formed body M after forming which is indicated by a chain line; and numerical control based on the stored data. The movable side-edge portion is biased by the springs 9 to move in a follow-up manner. However, as for this operation of moving the movable side-edge portion, instead of the biasing force of the springs 9, actuators 19 such as oil-hydraulic cylinders may be adopted to move the movable side-edge portion using the actuators 19 as illustrated in FIG. 3. Further, the moving operation of the actuators 19 may be based on data concerning the outer peripheral shape of the tubular formed body which is previously stored in the control unit as described above. Alternatively, a sensor for detecting the path along which the forming blade moves in the radial and axial directions may be provided to perform control based on data concerning the moving path chronologically detected by this sensor.

Figure 4:
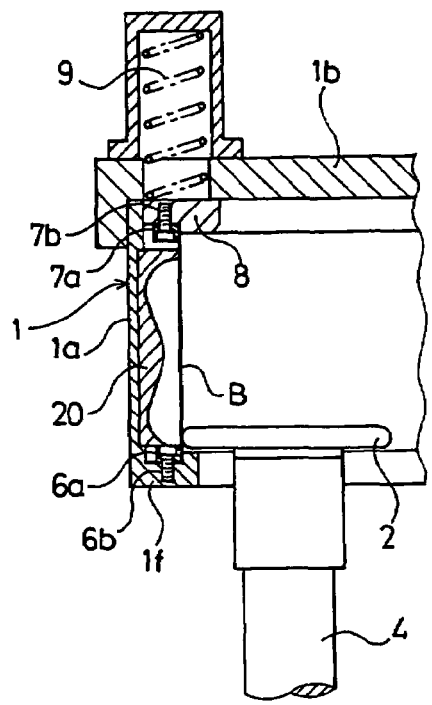
FIG. 4 is a schematic diagram illustrating a major part of yet another embodiment of a forming device used in the present invention.

Furthermore, when the peripheral wall of the tubular blank B is formed into a raised shape using the forming blade 2, as illustrated in FIG. 4, a wave-shaped die 20 having a shape corresponding to the outer peripheral shape of the tubular formed body M after forming may be placed on the outside of the tubular blank B in the radial direction. The placement of such a wave-shaped die 20 makes it possible to limit the movement of the movable side-edge portion with high accuracy. Further, when the peripheral wall of the tubular blank B is formed into a recessed shape as in the example of FIGS. 6 to 7C described later, the above-described wave-shaped die 20 is placed on the inside of the tubular blank B in the radial direction.

For the tubular formed body M formed by the present invention, the tubular blank B is deformed so that the diameter is expanded only in an intermediate region of the peripheral wall, with a side-edge portion of the tubular blank B supported at a predetermined position in a fixed state. Accordingly, the side-edge portion is substantially not subjected to a deforming operation. Thus, the tubular formed body M can be formed without causing wrinkles and ruptures in side-edge portions which appear in known forming methods.

Figure 5:
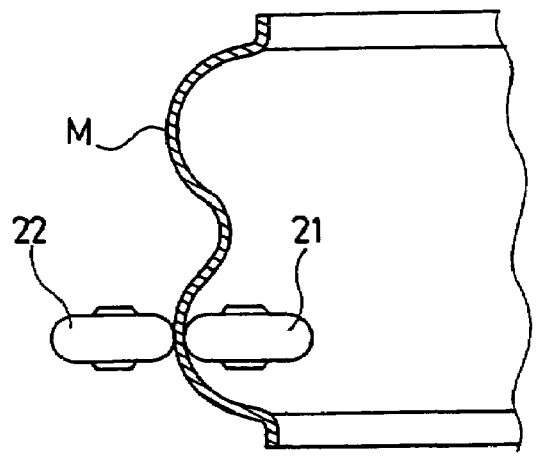
FIG. 5 is an explanatory diagram illustrating finishing in the production method of the present invention.

In the present invention, the above-described actions and effects are also the same even in the case where a tubular blank made of a metal material having a breaking stress of not less than 600 MPa is formed. However, when such a tubular blank made of a metal material having a large breaking stress is formed, forming with high accuracy which causes fewer wrinkles and ruptures can be performed by: forming the tubular blank to 75 to 85% of a final shape by use of the aforementioned forming method and then, as illustrated in FIG. 5,; and performing finishing into the final shape by respectively pressing forming rollers 21 and 22 against the inside and outside of the tubular formed body M half-formed.

FIG. 6 and FIGS. 7A to 7C illustrate a forming device used in a method of producing a tubular formed body of the present invention, which device is used in the case where a wheel rim is formed. That is, it is a device used in the case where a recess portion is formed in the peripheral wall of a tubular blank so as to continue in the circumferential direction.

Figure 6:
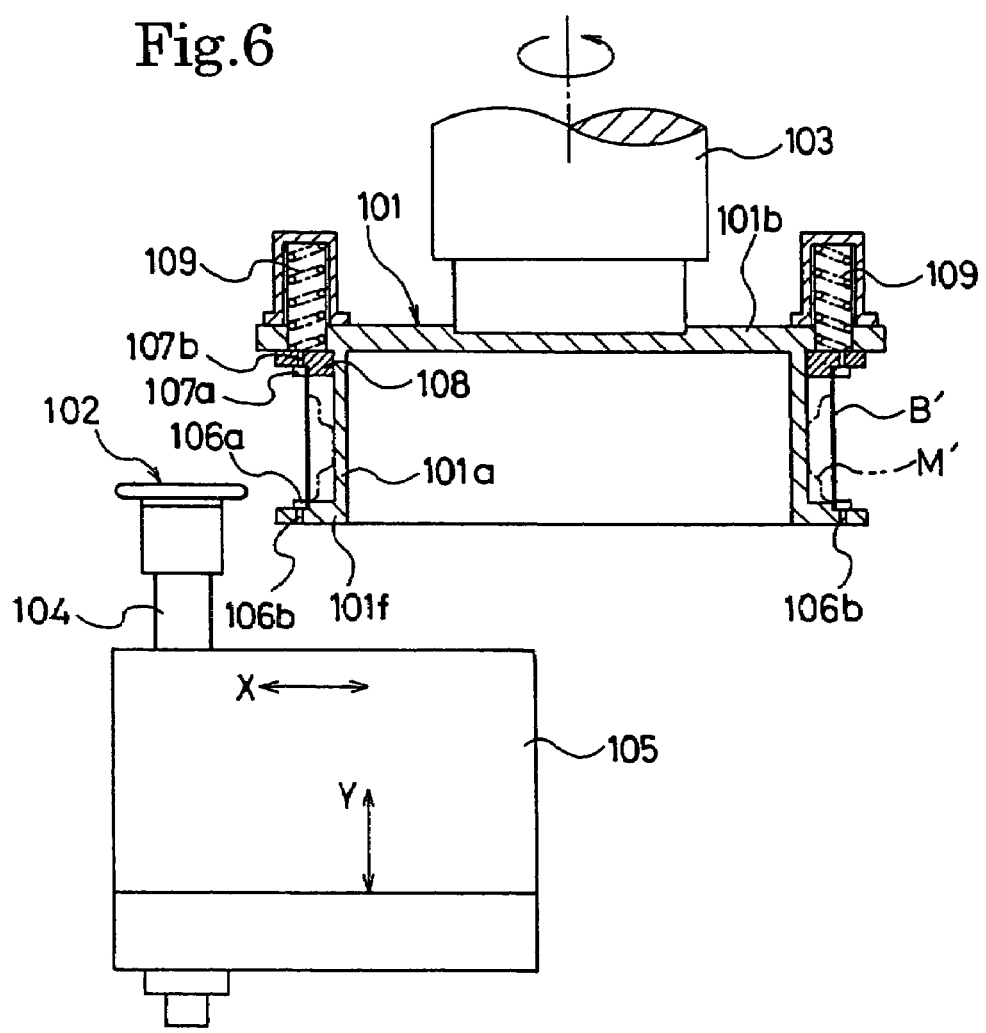
FIG. 6 is a schematic diagram illustrating another forming device used in a production method of the present invention.
Figure 7:
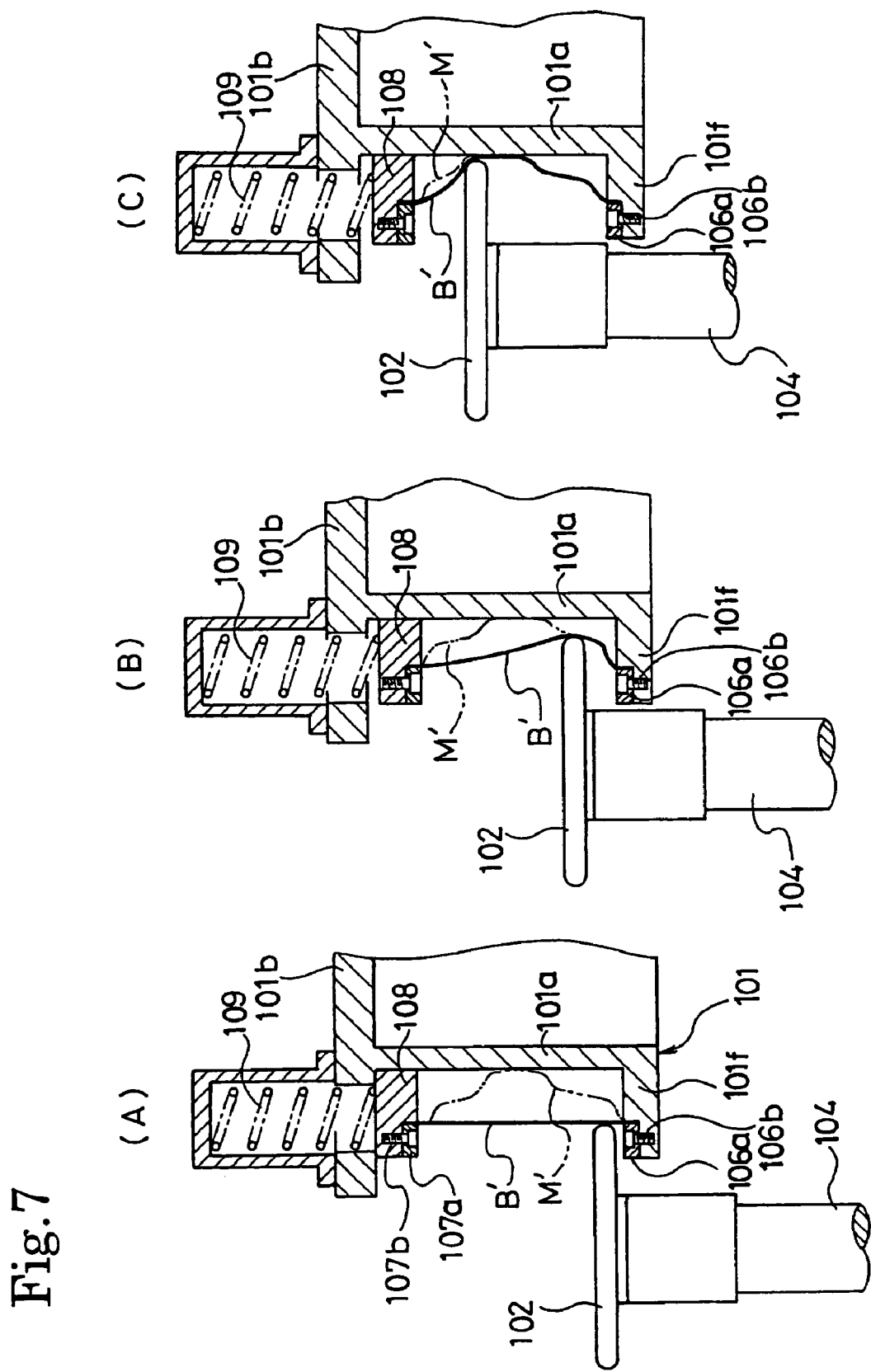
FIGS. 7A to 7C are explanatory diagrams illustrating a method of forming a tubular formed body using the forming device of FIG. 6.
Figure 8:
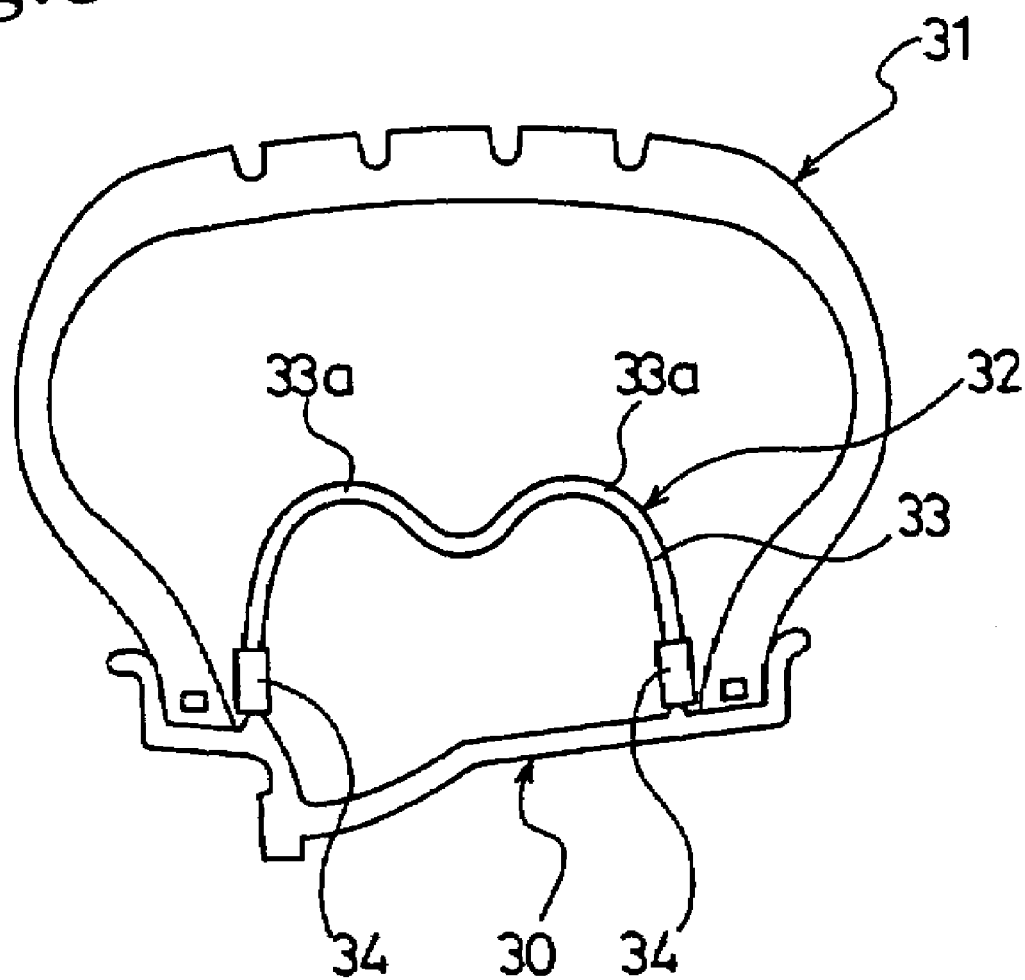
FIG. 8 is a cross-sectional view illustrating a run-flat tire/rim structure in which a wheel rim and an annular shell of a run-flat support body, which are to be produced by the present invention, are combined.

In FIG. 6, 101 denotes a rotating frame, and 102 denotes a forming blade. The rotating frame 101 has a cylindrical holding frame 101a. A disk-shaped support plate 101b is fixed to the back surface of the holding frame 101a. The rotating frame 101 is rotationally driven by a drive shaft 103 coupled to the central axis of the support plate 101b. On the other hand, the forming blade 102 has a disk-like shape, and the cross section of an outer peripheral contact portion has an arc shape. The forming blade 102 is rotationally driven by a drive shaft 104, and is operated by a drive unit 105 so as to move in the radial direction (X direction) and the axial direction (Y direction) of the rotating frame 101. The moving operation is numerically controlled (NC) by a program previously set in a control unit (not shown).

A tubular blank B' is set in the holding frame 1a of the above-described rotating frame 101. As illustrated in FIGS. 7A to 7C, in the rotating frame 101 (holding frame 101a), one side-edge portion of the tubular blank B' is fixed to a predetermined position of a flange portion 101f using a gripping ring 106a and bolts 106b, whereby the movement of the side-edge portion in the radial and axial directions is limited. Further, the other side-edge portion thereof is fixed to a ring 108, which is inserted in the rotating frame 101 (holding frame 101a) so as to be slidable in the axial direction, using a gripping ring 107a and bolts 107b, whereby the other side-edge portion can move with the ring 108 in the axial direction. In the gripping surfaces of the flange 101f and the ring 108 which respectively face the inner diameter sides of the gripping rings 106a and 107a, the corner portions thereof, which respectively serve as supporting points when side-edge portions are folded, are beveled into arcs having curvature radii of approximately 2 to 10 mm. Further, the ring 108 is biased by springs 109 arranged regularly in the circumferential direction of the support plate 101b, whereby the above-described movable side-edge portion is biased toward the fixed side-edge portion (flange 101f).

FIGS. 7A to 7C illustrate the case where the tubular blank B' set to the rotating frame 101 (holding frame 101a) as described above is formed into a tubular formed body M' (wheel rim) having an outer peripheral shape indicated by a chain line through the operation of moving the forming blade 102.

First, as illustrated in FIG. 7A, the forming blade 102 is placed on the outer diameter side of the peripheral wall of the tubular blank B' supported by the rotating frame 101 (holding frame 101a), and, at the same time, and is pressed against the outer peripheral surface of the side-edge portion of the tubular blank B', the sid-edge portion being fixed to a predetermined position (fixed using the bolts 106b).

Then, as illustrated in FIGS. 7B and 7C, the contact portion of the forming blade 102 is reciprocated from the side-edge portion fixed to a predetermined position radially inward along the outer peripheral surface shape (recess portion) of the tubular formed body M', the shape being indicated by a chain line, so that the diameter is reduced, and is moved in the axial direction, whereby a recess portion is formed in the peripheral wall of the tubular blank B' so as to continue in the circumferential direction. In a process in which the recess portion is formed in the peripheral wall of the tubular blank B' as described above, the movable side-edge portion coupled to the ring 108 is gradually moved toward the portion fixed to a predetermined position, by the biasing force of the springs 109. This movement differs depending on the length of the path along which the forming blade 102 moves when performing forming. Thus, as indicated by chain lines in the drawings, a wheel rim, which is the tubular formed body M' having a recess portion corresponding to a rim on the outside in the radial direction, is formed.

As described above, only an intermediate region of the peripheral wall is deformed using the forming blade 102 so that the diameter is reduced, with a side-edge portion of the tubular blank B' supported at a predetermined position in a fixed state. Accordingly, the side-edge portion is substantially not subjected to a deforming operation. Thus, by use of the aforementioned foming method, the tubular formed body M' can be formed without causing wrinkles and ruptures in side-edge portions which have appeared in known forming methods.

INDUSTRIAL APPLICABILITY

The present invention can be utilized to produce a wheel rim used in an automobile wheel, an annular shell of a run-flat support body provided in a run-flat wheel, or the like. In addition, the present invention can be utilized to produce a corrugated pipe used as a component of a fluid-conveying pipe, a ring reinforcement used as a component of a tubular vessel or a chemical reactor, or the like.

What is claimed is:

1. A method of producing a tubular formed body, comprising the steps of:
    using a forming device having a rotating frame and a forming blade movable in axial and radial directions of the rotating frame;
    fixing one side-edge portion of a tubular blank to a predetermined position of the rotating frame;
    setting the other side-edge portion of the tubular blank to the rotating frame so that the other side-edge portion is movable;
    pressing the forming blade to an inner diameter side of a peripheral wall of the tubular blank while rotating the rotating frame;
    moving the forming blade from the fixed side-edge portion toward the movable side-edge portion while reciprocating the forming blade in a radially outward direction; and
    forming a tubular formed body in which at least any one of a ridge portion and a recess portion continuing in circumferential direction is shaped in the peripheral wall,
    wherein the tubular formed body is an annular shell of a run-flat support body.

2. The method of producing a tubular formed body according to claim 1, wherein in a case where the forming blade is reciprocated in the radially outward direction while the forming blade is being pressed to the inner diameter side of the peripheral wall of the tubular blank, the side-edge portion fixed to the predetermined position is made equal to a minimum inner diameter of the tubular formed body.

3. The method of producing a tubular formed body according to claim 2, wherein a wave-shaped die corresponding to an outer peripheral shape of the tubular formed body is placed on an outside of the tubular blank in the radial direction.

4. The method of producing a tubular formed body according to claim 1, wherein the movable side-edge portion is bound to the same radial position as that of the side-edge portion fixed to the predetermined position to be movable in the axial direction.

5. The method of producing a tubular formed body according to claim 1, wherein a biasing force in a direction of the side fixed to the predetermined position is applied to the movable side-edge portion.

6. The method of producing a tubular formed body according to claim 1, further comprising an actuator provided at the movable side-edge portion, and a control unit which controls operation of the actuator,
    wherein the actuator is operated toward the side fixed to the predetermined position, in accordance with a path along which the forming blade moves in the radial and axial directions.

7. The method of producing a tubular formed body according to claim 1, wherein a cross-sectional shape of a pressing end of the forming blade is an arc.

8. The method of producing a tubular formed body according to claim 1, wherein after the ridge portion has been formed by moving the forming blade from the side-edge portion of the tubular blank which is fixed to the predetermined position to the movable side-edge portion, the ridge portion is re-formed by moving the forming blade from the movable side-edge portion to the side-edge portion fixed to the predetermined position in a reverse direction, and the reciprocating forming is repeated at least once.

9. The method of producing a tubular formed body according to claim 1, further comprising the step of: after forming the tubular formed body, finishing the tubular formed body into a final shape by pressing forming rollers against inside and outside of the tubular formed body, respectively.

10. The method of producing a tubular formed body according to claim 1, wherein the tubular blank is made of a metal material having a breaking stress of not less than 600 MPa.

* * * * *